United States Patent Office 3,729,432
Patented Apr. 24, 1973

3,729,432
DETERGENT BUILDER COMPOSITION
Herman A. Bruson, Woodbridge, Conn., and Henry Gould, Houston, Tex., assignors to Milchem Incorporated, Houston, Tex.
No Drawing. Filed Aug. 6, 1971, Ser. No. 169,870
Int. Cl. C11d 1/12, 3/20, 7/26
U.S. Cl. 252—545
14 Claims

ABSTRACT OF THE DISCLOSURE

The present invention relates to a detergent builder composition having the formula:

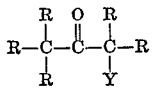

wherein R is —$CH_2$—$CH_2$—COOX, X being a member selected from the class consisting of hydrogen, alkali metals, ammonium and substituted ammonium, and Y is selected from the class consisting of hydrogen and

—$CH_2CH_2$—COOX,

X being selected from the class consisting of hydrogen, alkali metals, ammonium and substituted ammonium.

BACKGROUND OF THE INVENTION

(1) Summary of the invention

The present invention relates to a detergent builder composition having the formula:

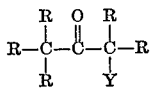

wherein R is —$CH_2$—$CH_2$—COOX, X being a member selected from the class consisting of hydrogen, alkali metals, ammonium and substituted ammonium, and Y is selected from the class consisting of hydrogen and

—$CH_2$—$CH_2$—COOX,

X being selected from the class consisting of hydrogen, alkali metals, ammonium and substituted ammonium.

(2) Description of the prior art

The broad concept of "built" detergent compositions has been known for some time and encompasses the capability possessed by certain substances of substantially improving the effectiveness of detergent compounds. The improved or enhanced result as evidenced by a washed article appearing cleaner and brighter is generally characterized as the "builder" effect. Compounds which perform in this manner are called builders. The improved performance attributed to the builder is manifested in a variety of ways. Among the ways with respect to which builders are thought to have useful effects are such factors as stabilization of suspended solid soils, emulsification of soils, the surface activity in an aqueous detergent solution, the solubilization of water-insoluble materials, foaming or suds producing characteristics of the washing solutions, peptization of soil agglomerates, neutralization of acid soils and the like, in addition to the sequestration of mineral constituents present in the washing solution. The term "detergent" is used in a general sense and is intended to embrace both cleaning and whiteness maintenance properties. Built detergent compositions prepared specifically for laundering the wide range of natural and synthetic fabrics commonly in use today are termed "heavy-duty" detergents. Such compositions rely for their effectiveness, in part, on a high proportion of builder materials being present in the composition.

The nature of the building action, while quite widely recognized in the literature is not completely understood. There does appear to be some connection between the ability of a builder to soften water which is used to make up the water solution and the improved result in detergency obtained when the builder is used. However, not all materials which act to sequester hardness-imparting calcium and magnesium ions perform satisfactorily as builders. No general basis has been found or is known either as regards physical properties or in chemical structure upon which one can predict with any degree of accuracy the performance of chemicals as detergent builders. Further, useful building actions with the most effective builders can be noted both above and below the point at which the builder is present in the washing solution in stoichiometric proportions to the hardness in water.

Building effects in detergents have been noted in connection with various inorganic alkaline salts such as alkali metal carbonates, bicarbonates, phosphates, polyphosphates and silicates. Similar building properties have also been noted in connection with certain organic salts such as alkali metal, ammonium or substituted ammonium aminopolycarboxylates such as sodium and potassium ethylenediaminetetraacetate, sodium and potassium N-(2-hydroxyethyl)-ethylenediaminetriacetate, sodium and potassium nitrilotriacetate, and sodium, potassium and triethanolammonium-N-(2 - hydroxyethyl)-nitrilodiacetate. Alkali metal salts of phytic acid have also been utilized to some degree as organic builders in detergent formulations.

In recent years, the detergent industry has become concerned about water pollution caused by phosphates. The use of these builders is being discouraged or prohibited by law in order to curtail the growth of algae in rivers, lakes and streams where the residues from household and industrial detergents can collect, causing ecological damage by maintaining an active growth of algae that normally require phosphate ions for metabolism and survival.

Cyanoethylation of various ketones with acrylonitrile has produced a variety of compositions. For example, it has been disclosed in U.S. Pat. No. 2,386,736, entitled "Cyanoethylation of Ketones," that acrylonitrile can be reacted in the presence of an alkaline condensing agent with a ketone having an active methyl, methylene, or methenyl group immediately adjacent to the carbonyl group. The reaction results in a beta-cyanoethyl radical being attached to the carbon atom adjacent to the carbonyl group. Ketones which can be reacted in this manner include acetone, phenoxyacetone, cyano-acetone, ethoxyacetone, acetophenone, p-methyl-acetophenone, acetyl-p-cymene, and the like. The polycarboxylic acid salt is then produced by saponification or hydrolysis.

It has been surprisingly discovered that organic pentacarboxylic and hexacarboxylic acids and water-soluble salts thereof prepared from cyanoethylated acetone which is subsequently saponified, possess extraordinary builder properties for a variety of synthetic detergents: for example, the long chain alkyl benzene sulfonate type, such as sodium isododecyl benzene sulfonate and sodium alkyl-aryl sulfonate. These carboxylic acids and salts do not contain phosphorus or nitrogen which can act to enhance and maintain the growth of algae.

It is therefore an object of the present invention to provide a new and improved class of detergent builder materials.

It is a further object of the present invention to provide a new detergent composition.

Other objects and advantages of the present invention will be readily apparent to those skilled in the art from a reading of the specification and claims which follow.

DESCRIPTION OF THE PREFERRED EMBODIMENTS

The polycarboxylic acids and water-soluble salts thereof used in the present invention may be prepared by reacting acetone in the presence of a strongly basic alkaline catalyst with sufficient acrylonitrile to introduce at least 5 and preferably 6 beta-cyanoethyl groups into the acetone molecule. Catalysts useful for this purpose are the alkali metals and their oxides, hydroxides, alkoxides, and hydrides, as well as strongly basic quaternary ammonium hydroxides and alkoxides. One or several of these materials may be suspended or dissolved in acetone or in a solution of acetone in an inert liquid which is less reactive than the reacting acetone, such as tertiary butyl alcohol. The quantity of strongly basic alkaline catalyst necessary for the reaction is between about 0.5% and 2.0% on the combined weight of the reactants. Preferably, about 1.0% is utilized.

The amount of acrylonitrile necessary to react with acetone to produce 5 and 6 beta-cyanoethyl groups on the acetone molecule will, of course, vary with the temperature and time of the reaction, as well as the selected solvent system and catalyst. However, good yields of 5 and 6 beta-cyanoethylated acetone can be successfully obtained by utilizing about 350 grams of acrylonitrile dissolved in about 120 grams of tertiary butyl alcohol, for each gram mole of acetone.

The reaction between acetone and acrylonitrile takes place readily at temperatures during the first half of the reaction from about 25° C. to about 35° C., preferably at 30° C. During the second half of the reaction, temperatures between about 50° C. and 65° C. are utilized, preferably 60° C. The reaction has been found to be exothermal so that cooling, at least during the initial part of the reaction, may be advantageous in order to control the vigor of the reaction and to prevent undesired polymerization or side reactions.

The reaction which occurs with five moles of acrylonitrile is:

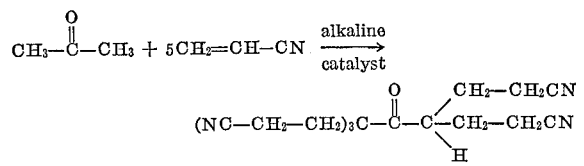

Similarly, acetone combines with 6 moles of acrylonitrile to give:

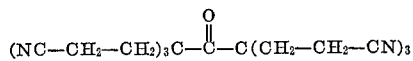

These cyanoethylation products are then saponified to the corresponding polycarboxylic acid salts by reacting with, for example, an aqueous alkali metal hydroxide, such as a sodium or potassium hydroxide solution to "split off" ammonia as completely as possible, giving a water-soluble salt. For example, in the case of the preparation of the sodium salt the reaction would be as follows:

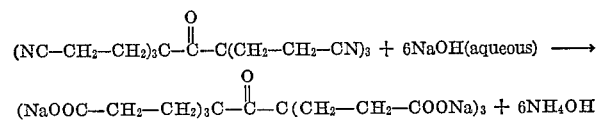

Any free akali can be neutralized with strong acids such as sulfuric or hydrochloric acid since the presence of minor amounts of alkali metal sulfates or chlorides in the dried finished product is tolerated in the detergent composition itself. The solvent may also be evaporated off to leave behind the non-volatile salt of the polycarboxylic acid.

The water-soluble alkali metal salts of the polycarboxylic acids prepared as above described can, if desired, contain more than one species of alkali metal cation. For example, in the case of beta-(hexacarboxyethyl)acetone, four of the six carboxyl groups can be neutralized with sodium hydroxide. Of the remaining two carboxyl groups, one each can be neutralized with potassium hydroxide and lithium hydroxide. These ratios can be varied to suit relevant conditions of crystallinity, hygroscopicity, and ease of spray drying, to meet the specific needs of various powdered, packaged detergents to give a readily flowable, non-caking, non-hygroscopic, white crystalline product. For most commercial, powdered, synthetic detergents, the hexasodium salt of hexacarboxyethylacetone, the pentasodium salt of pentacarboxyethyl acetone, and mixtures thereof are preferred because of low cost and efficiency. However, other water-soluble salts may also be used. For example, sodium, potassium, lithium, ammonium, ethanolammonium, diethanolammonium, triethanolammonium, cyclohexylammonium, morpholinium, piperidinium, hydrazinium, benzyl ammonium, and the like, may also be successfully used.

Many varieties of synthetic detergents may be built with the builder of the present invention. Generally speaking, any anionic detergent may be successfully utilized. These detergents are water-soluble salts, especially the alkali metal salts of sulfuric reaction products having in their molecular structure an alkyl radical containing from about 8 to about 22 carbon atoms and a radical selected from the class consisting of sulfonic acid and sulfuric acid ester radicals. Among the particular materials which can be used are: (1) the sodium alkyl sulfates, particularly those obtained by sulfating high carbon alcohols produced by reducing glycerides of tallow or coconut oil, (2) sodium or potassium alkylbenzenesulfonates in which the alkyl group contains about $C_9$ to about $C_{18}$, (3) sodium alkylpolyethersulfonates, especially those ethers of the higher alcohols derived from tallow and coconut oil, (4) sodium coconut oil fatty acid monoglyceride sulfates and sulfonates, (5) sodium or potassium salts of sulfuric acid esters of the reaction product of 1 mole of a higher fatty alcohol and about 1 to 6 moles of ethylene oxide, (6) sodium or potassium salts of alkylphenol polyoxyalkylene ether sulfate with about 1 to 10 units of alkylene oxide per molecule and in which the alkyl radicals contain about 9 to about 18 carbon atoms, (7) the reaction product of fatty acids esterified with isethionic acid and neutralized with sodium hydroxide, where, for example, the fatty acids are derived from coconut oil, and (8) sodium or potassium salts of fatty acid amides of taurine in which the fatty acids are derived from coconut oil or the like. These detergents compounds can be formulated into a variety of forms such as granular, flake, liquid and tablet forms. One of the outstanding and surprising aspects of the utilization of our builder composition is the fact that it has been found to be four times as effective as phosphate containing builders.

Generally speaking, when preparing either granular or liquid detergent formulations, about 5% to about 50% of the total active formulations may consist of the present builder. Under normal circumstances, about 10% of our builder has been found to be preferred. However, the exact amount of the builder composition of the present invention utilized will vary depending on the base detergent formulation and the particular commercial application at hand.

Our builder composition has been found to have particular utility in liquid detergents. Liquid detergents have posed especially perplexing and difficult problems for the detergent formulators, mainly because of solubility and stability factors in aqueous mediums. It is well known that although sodium tripolyphosphate is effective in granular detergents, it is not satisfactory in liquid formulations because of conversion to orthophosphate. In view of the increasing acceptance by the industry of liquid detergents it is a very significant contribution of the present invention that an improved built liquid detergent product is made possible that will provide detergency levels far superior to a sodium tripolyphosphate built liquid product in a liquid formulation.

Most of the built liquid detergents available are either water based or have a mixture of water and alcohol as the liquid base. Our detergent builder composition may be satisfactorily utilized in these bases.

A detergent formulation containing our builder composition may contain a variety of miscellaneous additives which may make the finished product more effective and commercially attractive. For example, a soluble sodium carboxymethylcellulose may be added in minor amounts to inhibit soil redeposition. A tarnish inhibitor such as benzotriazole or ethylenethiourea may be added in minor amounts. Fluorescence, perfume, coloring compounds, and optical brightening agents may be frequently desirable. An alkaline material or alkali such as sodium or potassium hydroxide may be added in minor amounts for pH adjustment. Additionally, moisture and heightening agents such as sodium sulfate and sodium carbonate may also be added. Other minor additives may also include corrosion and scale inhibitors and hydrotropic agents to promote homogeneity at lower temperatures.

The following examples further illustrate the novel qualities of the present invention:

EXAMPLE I

The present example illustrates the preparation of the present builder composition. Into a one liter 3-neck flask fitted with a stirrer, thermometer, funnel and reflux condenser, was added a solution of 40 grams of tertiary butyl alcohol, 29 grams acetone and 10 grams of 5% potassium hydroxide in a solution of 95% tertiary butyl alcohol. To this solution was added dropwise a solution of 70 grams tertiary butyl alcohol and 170 grams of acrylonitrile. Intermittent cooling was required because of an observed vigorous exotherm. 15% of the acrylonitrile solution was added at a temperature of about 20° C.±2° C. The next 20% of the acrylonitrile solution was added at 30° C. to 35° C. After one hour of acrylonitrile addition, the reaction was "aged" for one hour. Ten grams of 5% potassium hydroxide in 95% tertiary butyl alcohol was then added as additional catalyst. The reaction temperature was then raised to 55° C. The remainder of the acrylonitrile solution was then added over a period of about 75 minutes. During this period, additional heating was required to maintain the reaction temperature at about 55° C.–60° C. The reaction batch was then permitted to "age" for 2½ hours at about 60° C. to 70° C.

The solvent and volatiles were distilled from the cyanoethylated material and the residue was hydrolyzed by adding 130 grams of sodium hydroxide dissolved in 705 grams of water. The batch was heated to reflux at 95° C. at which point vigorous ammonia evolution was noted. The reflux was continued for 3 hours until the ammonia in the overhead was negligible and the terminal pot temperature was between 105° C.–110° C. Reflux was then continued for 3 additional hours to complete the hydrolysis with intermittent distillate removal. Three additional hours of reflux were required to insure the absence of nitrogen. The pH of the material was adjusted to about 9 with concentrated hydrochloric acid.

EXAMPLE II

Standard Tergotometer tests were made to determine the soil removal effectiveness of a representative laundry detergent composition containing 40% sodium tripolyphosphate in a control formulation and 10% of the builder composition of the present invention in a similar formulation. This test is one commonly used in the industry and is detailed in "Proposed Method for Measuring Soil Removal and Whiteness Retention of Fabrics," published by the American Society for Testing and Materials, February 1969. This method provides a means of measuring the ability of detergents to remove artificial soil from fabric and prevent its redeposition on clean fabric. A laboratory-scale agitator-type washing machine is utilized, together with a reflectometer which is calibrated by means of standard vitreous enamel plaques having reflectance in the range of the fabric sample being measured. The washer is operated at a suitable fixed speed which is recorded with test results. After washing, the sample material is damp dried between clean toweling and then ironed flat between two pieces of clean white cotton sheeting. The reflectance readings are then determined. The test builder of the present invention was a sample of the sodium salt made as in Example 1. The detergent compositions were as follows.

|  | Control (percent by wt.) | Test formula (percent by wt.) |
|---|---|---|
| Polycarboxylic builder | | 10.0 |
| Sodium tripolyphosphate | 40.0 | |
| Carboxymethyl cellulose | 1.0 | 1.0 |
| Sodium silicate | 7.0 | 7.0 |
| Sodium sulfate | 36.0 | 66.0 |
| Linear sodium alkylaryl sulfonate | 16.0 | 16.0 |

Each sample was tested at a dilution of 0.25% in water having a hardness rating of 15 grains per gallon. Detergency was measured as the increase in diffuse reflectance accomplished after the laundering of the following three different soiled cloths:

(1) Test fabric soiled cotton, wash and wear finish
(2) ACH 115 soiled cotton [1]
(3) U.S. Testing Soiled Cotton

[1] Supplied by ACH Fabric Service, Inc., Boston, Mass.

The calculation of the improvement in reflectance was made as follows:

Percent improvement in
$$\text{reflectance} = [(A-B)/(C-B)] \times 100$$

A = average reflectance of 16 soiled swatches after washing,

B = average reflectance of 16 soiled swatches before washing, and

C = average reflectance of 4 unsoiled swatches before washing.

To assure the presence of the correct amount of each formula ingredient in the wash solution, dilute aqueous solutions of both samples were prepared and added on an aliquot basis to the Tergotometer beaker.

The Tergotometer test was made in accordance with the following test conditions:

| | |
|---|---|
| Amount of solution/vessel | 1 liter. |
| Temperature | 125° F.±1°. |
| Speed of agitation | 150 cycles/minute. |
| Water hardness | 15 grains./gallon. |
| Concentration of formulated detergent | 0.25%. |
| Wash time | 15 minutes. |
| Rinse | 2 five minute cycles. |

The results of soil removal tests are as follows:

TABLE 2-A

Average Increase in Diffuse Reflectance

| Builder | ACH 115 cotton | U.S. testing cotton | Test fabric cotton | Total gain |
|---|---|---|---|---|
| Control | 30.7 | 6.9 | 12.4 | 50.0 |
| Polycarboxylic acid salt | 29.4 | 7.3 | 13.6 | 50.3 |

Soil redeposition was studied on the same compositions using the multiple wash, Tergotometer technique. This technique requires a single quantity of a clean fabric (white, desized Indianhead cotton) to be washed a minimum of three consecutive times in the presence of standard soiled fabrics such as those used in the soil removal tests detailed above. New specimens of soiled cloth were used in each wash replicate. The compositions were again tested at 0.25% concentration in water having a hardness rating as specified above. Soil redeposition was measured as the decrease in 45 diffuse reflectance. The results of this test are indicated in the following table.

TABLE 2-B

| Builder: | Average decrease in diffuse reflectance |
|---|---|
| Control | 10.4 |
| Polycarboxylic acid salt | 12.3 |

It will be noted that diffuse reflectance decrease is higher in the case of the detergent formulation containing the detergent builder of the present invention. However, it must be remembered that the control formulation contained 40% sodium tripolyphosphate while the polycarboxylic acid salt was used at the 10% level.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A detergent composition consisting essentially of (1) a builder having the formula

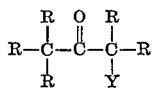

wherein R is —CH$_2$—CH$_2$—COOX, X being a member selected from the class consisting of hydrogen, alkali metals, ammonium and substituted ammoniums selected from the class consisting of ethanolammonium, diethanolammonium, triethanolammonium, cyclohexylammonium and benzyl ammonium, and Y is selected from the class consisting of hydrogen and —CH$_2$—CH$_2$—COOX, X being selected from the class consisting of hydrogen, alkali metals, ammonium and substituted ammoniums selected from the class consisting of ethanolammonium, diethanolammonium, triethanolammonium, cyclohexylammonium and benzyl ammonium, and (2) a water-soluble salt of a sulfuric reaction product selected from the class consisting of (A) sodium alkyl sulfates, (B) sodium and potassium alkylbenzenesulfonates in which the alkyl group contains about C$_9$ to about C$_{18}$, (C) sodium alkylpolyethersulfonates, (D) sodium coconut oil fatty acid monoglyceride sulfates and sulfonates, (E) sodium and potassium salts of sulfuric acid esters of the reaction product of 1 mole of a fatty alcohol and about 1 to 6 moles of ethylene oxide, (F) sodium and potassium salts of alkylphenol polyoxyalkylene ether sulfate having present from about 1 to about 10 units of alkylene oxide per molecule and in which the alkyl radicals contain from about 9 to about 18 carbon atoms, (G) the reaction product of a coconut oil fatty acid esterified with isethionic acid and neutralized with an alkali metal hydroxide, and (H) sodium and potassium salts of coconut oil fatty acid amides of taurine, the amount of said builder in said composition being from between about 5% and about 50% by weight.

2. The detergent composition of claim 1 wherein the amount of said builder in said composition is from between about 5% and about 20% by weight.

3. The detergent composition of claim 1 wherein the amount of said builder in said composition is about 10% by weight.

4. A detergent composition consisting essentially of (1) a builder having the formula:

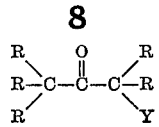

wherein R is:

—CH$_2$—CH$_2$—COONa and Y is selected from the class consisting of H and:

—CH$_2$—CH$_2$—COONa and (2) a sodium or potassium salt of an alkyl benzene sulfonate having an alkyl group containing from about C$_9$ to about C$_{18}$, the amount of said builder in said composition being from between about 5% to about 50% by weight.

5. The detergent composition of claim 4 wherein the amount of said builder in said composition is from between about 5% and about 20% by weight.

6. The detergent composition of claim 1 in liquid form.

7. The detergent composition of claim 1 in granular form.

8. The detergent composition of claim 2 in liquid form.

9. The detergent composition of claim 2 in granular form.

10. The detergent composition of claim 5 in liquid form.

11. The detergent composition of claim 3 in granular form.

12. The detergent composition of claim 4 in liquid form.

13. The detergent composition of claim 4 in granular form.

14. A detergent composition consisting essentially of (1) a beta-(hexacarboxyethyl)-acetone builder wherein the carboxyl groups in the acetone molecule are neutralized with at least one member selected from the class consisting of sodium, potassium and lithium hydroxide, and (2) a water-soluble salt of a sulfuric reaction product selected from the class consisting of (A) sodium alkyl sulfates, (B) sodium and potassium alkylbenzenesulfonates in which the alkyl group contains about C$_9$ to about C$_{18}$, (C) sodium alkylpolyethersulfonates, (D) sodium coconut oil fatty acid monoglyceride sulfates and sulfonates, (E) sodium and potassium salts of sulfuric acid esters of the reaction product of 1 mole of a fatty alcohol and about 1 to 6 moles of ethylene oxide, (F) sodium and potassium salts of alkylphenol polyoxyalkylene ether sulfate having present from about 1 to about 10 units of alkylene oxide per molecule and in which the alkyl radicals contain from about 9 to about 18 carbon atoms, (G) the reaction product of a coconut oil fatty acid esterified with isethionic acid and neutralized with an alkali metal hydroxide and (H) sodium and potassium salts of coconut oil fatty acid amides of taurine, the amount of said builder in said composition being from between about 5% and about 50% by weight.

References Cited

UNITED STATES PATENTS

| 2,386,736 | 10/1945 | Bruson | 260—465.4 |
| 2,770,640 | 11/1956 | Journeay | 260—537 |

LEON D. ROSDOL, Primary Examiner

E. L. ROLLINS, Assistant Examiner

U.S. Cl. X.R.

252—DIG. 11, 89, 135, 525, 526, 527, 531, 532, 535, 539, 544, 546, 550, 551, 554, 557, 558; 260—537